Patented May 25, 1926.                                                1,586,035

UNITED STATES PATENT OFFICE.

FREDERICK F. FRICK AND CARL EBERHARD CARSTENS, OF ANACONDA, MONTANA, ASSIGNORS TO ANACONDA COPPER MINING COMPANY, OF ANACONDA, MONTANA, A CORPORATION OF MONTANA.

ELECTROLYTIC PRECIPITATION OF COPPER.

No Drawing.            Application filed October 23, 1925. Serial No. 64,454.

This invention relates to the so-called leaching-electrolytic process for the recovery of copper from ores and more particularly to a process for the treatment of oxide copper ores containing iron and associated impurities.

The known so-called leaching-electrolytic process for the recovery of copper from ores consists generally in leaching the ore with a liquid containing an acid such as sulfuric acid, subjecting the resulting leaching solution to electrolysis, whereby copper is precipitated and the acid combined therewith is regenerated, and using the resulting electrolytic solution for leaching more ore, the process being cyclical with respect to the movement of the solution.

In this known process difficulties are encountered due to the presence of iron and other impurities in the ore and the building up or accumulation of these impurities in the cyclically moving solution. Iron is a particularly objectionable impurity, since it reduces the efficiency of the electrolysis, causes corrosion of the cathode and renders the electrolytic solution less efficient as a leaching solution. The removal of iron from the solution by the method known as "discarding" according to which a portion of the solution at a suitable point in its cycle is set aside and treated with iron to recover its copper content as cement copper and then discarded, is not satisfactory due to the cost of the iron used and the undesirability of cement copper as compared with electrolytic copper.

It has been proposed by Frederick Laist and Frederick F. Frick in their application Serial No. 64,456, filed concurrently herewith to avoid the difficulties referred to by the precipitation of iron from the solution between the leaching step and the electrolysis by means of a basic reagent such as calcium carbonate or limerock. This proposed process is carried out in a specific instance in the following manner:

A copper ore capable of yielding 25 to 30 pounds of copper per ton of ore is leached, preferably by a counter-current procedure, with a solution of sulfuric acid. About one-fourth of a pound of iron and one-twelfth of a pound of aluminum is dissolved for each pound of copper extracted from the ore. The resulting leaching solution containing say 40 grams of copper, 7 to 10 grams of iron, 5 to 6 grams of aluminum, and 10 grams of free sulfuric acid per liter is treated with limerock, preferably of a fineness less than 65 mesh, in quantity amounting to 30 grams of the limerock per liter of solution. The limerock or limestone consists essentially of calcium carbonate and may be regarded simply as an inexpensive supply thereof. The treatment of the solution with this quantity of limerock results in the formation of a bulky precipitate of basic iron and aluminum compounds and calcium sulfate with phosphorus, arsenic and antimony compounds if present. The precipitate is separated from the solution by filtration, either hot or cold, and thoroughly washed. The purified solution is substantially neutral and practically free of ferric iron, phosphorus, arsenic and antimony. About half of the original aluminum content of the solution and the ferrous iron amounting to from 10 to 25 percent of the total iron content of the solution and the bulk of the copper are not removed. The purified solution containing only about $1\frac{1}{2}$ to $2\frac{1}{2}$ grams of iron per liter is well adapted to electrolysis and gives a regenerated sulfuric acid solution suitable for use for further leaching. The separated precipitate from the limerock treatment contains about 2 percent of the total copper extracted from the ore which may be recovered, if desired or economically feasible, by leaching with sulfuric acid.

This proposed process eliminates any necessity for discarding the electrolyte for the removal of iron, but dilute wash waters are produced by washing the precipitate and dilute waste solutions may occur at other points in the commercial operation of the process. Such solutions contain copper which of course should be recovered. Besides, as stated above, the precipitate contains copper which it is desirable to recover in an economical way.

Heretofore the usual method for recovering copper from such waste dilute solutions as are encountered was by cementation on iron but this requires expensive iron and gives cement copper which is a less valuable product than electrolytic copper.

Now, according to the present invention, the copper content of the waste solutions is recovered by precipitating it as copper carbonate. This may be accomplished by simply agitating the copper containing solutions with an excess of finely divided limerock, preferably less than 65 mesh. The quantity of limerock required of course will depend upon the acidity and copper content of the solution or wash water treated. As appears from the foregoing description of the method of removing iron from leaching solutions, the quantity of limerock used is the quantity sufficient to render the solution substantially neutral, iron and associated impurities being precipitated while the copper remains in solution. For the precipitation of copper it is necessary to use limerock in quantity in excess of that necessary to neutralize the solution, and as a result there is obtained a precipitate of copper carbonate, calcium sulfate and basic iron and aluminum compounds, if iron and aluminum are present, mixed with the undissolved excess of limerock used. The copper content of this precipitate may be recovered by leaching with acid if desired, but preferably is recovered by a special procedure to be described.

The solution or wash water from which the copper has been stripped is available for further use, for instance, as wash water.

Further in accordance with the present invention the recovery of copper from the precipitate formed by the copper stripping operation described is combined with the step of removing iron from the leaching solution. This precipitate, as stated, contains copper carbonate and the undissolved excess of limerock used and may be used directly in place of fresh limerock for the treatment of the leaching solution for the removal of iron. The precipitate is simply added to the leaching solution and the mixture agitated. As a result the iron and associated impurities in the leaching solution are precipitated and removed and the copper content of the precipitate is dissolved in the leaching solution from which it is recovered as electrolytic copper. As is apparent, the copper carbonate and limerock content of the precipitate or sludge formed in the copper stripping operation may be insufficient to accomplish the precipitation of the iron from the leaching solution, in which case additional limerock may be supplied either with the copper carbonate precipitate or subsequently, or the excess of limerock used in the copper stripping operation may be increased so that the copper stripping precipitate will just serve for the treatment of the leaching solution.

The process of the present invention has numerous advantages. In addition to those incident to the removal of iron from the leaching solution it increases the recovery of copper from about 90 per cent of cathode copper, if the stripping operation were not used, up to about 98 per cent of cathode copper, and gives clean waste waters suitable for re-use in the process. The cost of the limerock is almost negligible and the cost of treatment is small.

We claim:

1. In a leaching electrolytic process for the recovery of copper from ores the steps which consist in treating waste solutions containing copper with a basic material capable of precipitating the copper content thereof, leaching the resulting sludge with acid, and recovering the copper content of the resulting solution by electrolysis.

2. In a leaching electrolytic process for the recovery of copper from ores the steps which consist in treating waste solutions containing copper with an excess of calcium carbonate, leaching the resulting sludge with acid, and recovering the copper content of the resulting solution by electrolysis.

3. In a leaching electrolytic process for the recovery of copper from ores the steps which consist in treating waste solutions containing copper with an excess of finely divided limerock, leaching the resulting sludge with acid, and recovering the copper content of the resulting solution by electrolysis.

4. In a leaching electrolytic process for the recovery of copper from ores the steps which consist in treating waste solutions containing copper with an excess of a basic material capable of precipitating copper, separating the resulting sludge, mixing said sludge with a leaching solution and agitating the mixture.

5. In a leaching electrolytic process for the recovery of copper from ores comprising leaching an ore with an acid solution and subjecting the resulting leaching solution to electrolysis the steps which consist in treating waste solutions produced in the process and containing copper with an excess of calcium carbonate, separating the resulting sludge, and agitating the separated sludge with the leaching solution prior to its electrolysis.

6. Process which comprises leaching an oxide copper ore with a solution containing sulfuric acid, treating the resulting leaching solution with a material comprising calcium carbonate in quantity sufficient to produce a substantially neutral solution, separating the resulting precipitate, washing the separated precipitate, treating the resulting washings with calcium carbonate in quantity greater than is soluble therein, separating the resulting sludge and using the separated sludge as a material containing calcium carbonate for treating the leaching solution in a succeeding cycle of the process.

7. In a leaching electrolytic process comprising leaching an oxide copper ore with a solution containing sulfuric acid, subjecting the resulting leaching solution to electrolysis and using the electrolytic solution for leaching more ore, said process involving the production of waste solutions containing copper, the steps which consist in agitating said waste solution with limerock in quantity sufficient to precipitate the copper content thereof, separating the resulting sludge and agitating said sludge with the leaching solution prior to subjecting it to electrolysis.

In testimony whereof, we affix our signatures.

FREDERICK F. FRICK.
CARL EBERHARD CARSTENS.